(12) United States Patent
Gentner et al.

(10) Patent No.: US 7,920,787 B2
(45) Date of Patent: Apr. 5, 2011

(54) METHOD FOR DETECTING A CHECK-BACK SIGNAL IN AN OPTICAL TRANSMISSION SYSTEM

(75) Inventors: Guido Gentner, München (DE); René Neumann, Planegg (DE); Gerhard Thanhäuser, Mering (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1377 days.

(21) Appl. No.: 10/510,973

(22) PCT Filed: Apr. 1, 2003

(86) PCT No.: PCT/DE03/01075
§ 371 (c)(1),
(2), (4) Date: Jun. 16, 2005

(87) PCT Pub. No.: WO03/088528
PCT Pub. Date: Oct. 23, 2003

(65) Prior Publication Data
US 2007/0269208 A1    Nov. 22, 2007

(30) Foreign Application Priority Data
Apr. 12, 2002  (DE) .................................. 102 16 279

(51) Int. Cl.
*H04B 10/08* (2006.01)
(52) U.S. Cl. ............. 398/16; 398/21; 398/30; 398/32
(58) Field of Classification Search .............. 398/16, 398/21, 30, 32
See application file for complete search history.

(56) References Cited

U.S. PATENT DOCUMENTS

| | | | |
|---|---|---|---|
| 6,285,475 B1 * | 9/2001 | Fee | 398/10 |
| 6,650,840 B2 * | 11/2003 | Feldman | 398/21 |
| 7,792,425 B2 * | 9/2010 | Aronson et al. | 398/30 |
| 2001/0033406 A1 | 10/2001 | Koike et al. | |
| 2002/0048062 A1 * | 4/2002 | Sakamoto et al. | 359/124 |
| 2003/0072064 A1 * | 4/2003 | Ohta | 359/177 |

FOREIGN PATENT DOCUMENTS

| | | |
|---|---|---|
| DE | 100 24 238 A1 | 1/2002 |
| DE | 100 46 104 A1 | 4/2002 |

OTHER PUBLICATIONS

Giammarco Rossi, Timothy E. Dimmick and Daniel J. Blumenthal, "Optical Performance Monitoring in Reconfigurable WDM Optical Networks Using Subcarrier Multiplexing", Journal of Lightwave Technology, IEEE, New York, US, vol. 18, No. 12, Dec. 2000, pp. 1639-1648, XP002179167.

* cited by examiner

*Primary Examiner* — Shi K Li
*Assistant Examiner* — Danny W Leung
(74) *Attorney, Agent, or Firm* — Laurence A. Greenberg; Werner H. Stemer; Ralph E. Locher

(57) ABSTRACT

The invention relates to a method for detecting a check-back signal in a transmission system for optical signals. According to said method, a constant proportion of the output in a defined frequency range of the check-back signal is concentrated in a narrow-band spectral range and is determined after a transmission phase by means of a narrow-band detection of the concentrated energy around the spectral range. If no signal is identified during the narrow-band detection, a line interruption is determined and no pump source is switched on for safety reasons. The narrow-band detection of the check-back signal also allows the transmission attenuation of the transmission system to be measured.

18 Claims, 2 Drawing Sheets

METHOD FOR DETECTING A CHECK-BACK SIGNAL IN AN OPTICAL TRANSMISSION SYSTEM

CROSS REFERENCE TO RELATED APPLICATIONS

This application is the US National Stage of International Application No. PCT/DE03/01075, filed Apr. 1, 2003 and claims the benefit thereof. The International Application claims the benefits of German application No. 10216279.4 filed Apr. 12, 2002, both of the applications are incorporated by reference herein in their entirety.

FIELD OF INVENTION

The invention relates to a method, device, and arrangement for detecting a check-back signal in an optical transmission system.

BACKGROUND OF INVENTION

In many cases, line discontinuities must be recognized in optical transmission systems and lasers and/or optical amplifications switched off, so as to avoid any danger to persons. Under the term, "automatic laser shutdown (ALS)", such measures form part of international standards.

DE 10046104.2 discloses a method and a device for recognizing line discontinuities in an optical WDM system with at least one optical amplifier on an optical transmission path, whereby a pilot signal is modulated to at least one of the optical signals to be transmitted.

However, the use of methods with a pilot signal still remains costly. Moreover, the signals can be disadvantageously influenced by experiencing a spectral broadening through modulation. In such methods, evaluation is only made after existing amplification.

From WO 99/48229 a method is known for the equivalent network in optical transmission devices, whereby apart from a working signal and a protection signal, respective check-back signals are transmitted with information about the state of seizure and evaluated at the receiving end. The check-back signals are transmitted via a monitoring channel even when the useable signal is switched off. In FIG. 6 of this publication a description is given of an arrangement for switching an amplifying station on or off, in which station a check-back signal as monitoring channel and a useable signal are separated into two paths using a demultiplexer. In the path of the check-back signal, the level is regenerated by means of an opto-electrical modulator, a regenerator and an electro-optical modulator. An amplifier with a subsequent level circuit-breaker is arranged in the path of the useable signal, said level circuit-breaker switching off the output signal on the amplifier if there is no useable signal. Here the regenerated check-back signal always continues to be transmitted at a low level. Provision is also made for decision logic modules, which check the presence or absence of an useable signal. Combined with a check-back signal, the transmission is rerouted to a transmission path that is not switched off and the laser in the interrupted line is switched off.

From US 2001/0033406 A1 a method is known for avoiding damage to the eye when a fiber-optic light guide is switched off visually, whereby, in addition to a data signal, a check-back signal is detected in a narrow-band spectral range. If the data signal has small signal-to-noise ratios or if the pump source used is switched off, there is a danger that the check-back signal is suppressed in its signal noise by amplitude limiting. Rather, comparators are used to compare the outputs between data signal and check-back signal, whereby the outputs of the check-back signal and of the data signal are chosen to be as similar as possible.

SUMMARY OF INVENTION

The object of the invention is to propose a method and a device that enable a check-back signal to be detected more easily independently of the useable signals;

As, when the pump source is switched off in the transmission system, the optical amplification is cancelled, the signal-to-noise ratio in the detection of the optically transmitted check-back signal is reduced correspondingly. The object of the invention is, therefore, also to ensure reliable recognition of the check-back signal even when the signal-to-noise ratio is reduced.

The object is achieved by the claims.

A method according to the invention for detecting a check-back signal in a transmission system for optical signals is described, said method comprising the following method steps:
- a constant proportion of the output in a defined frequency range of the check-back signal is concentrated in as narrow-band spectral range as possible,
- at the sending end, the check-back signal is fed into the transmission system,
- after a section of the transmission system, the check-back signal is decoupled,
- the decoupled check-back signal is opto-electrically modulated, amplified and filtered to isolate the most narrow-band spectral line possible of the check-back signal,
- the output of the isolated narrow-band spectral line is determined for the detection of the check-back signal.

A simple signal from a monitoring channel for the network management can be used as a check-back signal. Of great advantage is the high output of the check-back signal in as narrow-band spectral range as possible by concentrating a constant proportion of its output in a defined frequency range. This allows detection, i.e. the recognition of the presence of the check-back signal, even if a regeneration is not possible because of a noise ratio that is too high within the bandwidth of the recognition signal.

An interesting application of the method is the method for recognizing a line discontinuity, which is executed entirely independently of the effective channels. This means that one or several pump sources can also remain switched off in the transmission system as long as the check-back signal is not detected. As a result, this advantageously excludes any danger to persons from escaping laser light.

A further application of the method is the method for measuring the transmission attenuation until the check-back signal is decoupled.

As the output of the isolated narrow-band spectral line is determined for the detection of the check-back signal, the ratio between this output that has been determined and the original concentrated defined proportion of the output gives the attenuation. Hereby a possible intermediate amplification of the check-back signal must also be taken into consideration with the corresponding value of the amplification.

Through the high output of the check-back signal in a narrow-band spectral range and with an amplification that is linear and as far as possible unlimited in amplitude following decoupling, the check-back signal can also be detected even with high noise. The narrow-band filter also eliminates a substantial part of the noise contained in the spectrum.

The method according to the invention and its applications are described using appropriate arrangements for their implementation.

One major advantage is the simplicity with which new components can be integrated into a standard transmission system in order to implement the method. The principal requirements for detecting the check-back signal are an encoding module for concentrating the defined proportion of the output of the check-back signal on as narrow-band spectral range as possible and a filter for isolating a spectral line corresponding to the spectral range. Other necessary components, such as, for example, monitoring channel, channel couplers and decouplers, opto-electrical modulator with an amplitude controlled amplifier for the full realization of the method according to the invention are already incorporated in modern transmission systems. This significantly reduces in an advantageous way the cost of realizing the arrangements for implementing the method according to the invention as well as its applications.

The check-back signal can be decoupled and detected at one or several locations or sections of a transmission system, e.g. at standard interfaces between transmission path and network management. Here all that is required is a single encoding module at the sending end in the transmission system with corresponding filters for isolating the narrow-band proportion of the check-back signal on the interfaces. The decoupled check-back signal is then regenerated at each interface and coupled, with sufficient output, into a further section of the transmission system. A decoding module is placed in the interface, e.g. downstream of a regenerator, so as to enable information to be transmitted to the network management with the decoded data format of the check-back signal. To retransmit the check-back signal with concentrated spectral range requires, in this case, a further encoding module. However, the encoding module is not necessary if no provision has been made for a data interface to the network management that allows new data to be input.

The filter for isolating the narrow-band proportion of the check-back signal generates a narrow band-pass filtering. This then also suppresses the white noise e.g. by increased spontaneous emission. The clock frequency is, for example, selected as narrow-band spectral range for the concentration of a defined proportion of the check-back signal. A CMI coding(Coded Mark Inversion) or a RZ coding (Return to Zero) of the check-back signal, for example, can be used for this. When the ones and zeros are equally distributed, half the entire output of the check-back signal is concentrated in a spectral line at the clock frequency. In order to avoid endless ones or endless zeros in the original check-back signal, there is provision in the encoding module for the data to be scrambled one more time, so that the narrow-band spectral range with half the signal output is secured.

Advantageous further developments of the invention are given in the dependent claims.

An exemplary embodiment of the invention is explained in greater detail below with reference to the drawing, in which;

DETAILED DESCRIPTION OF INVENTION

Figure 1:
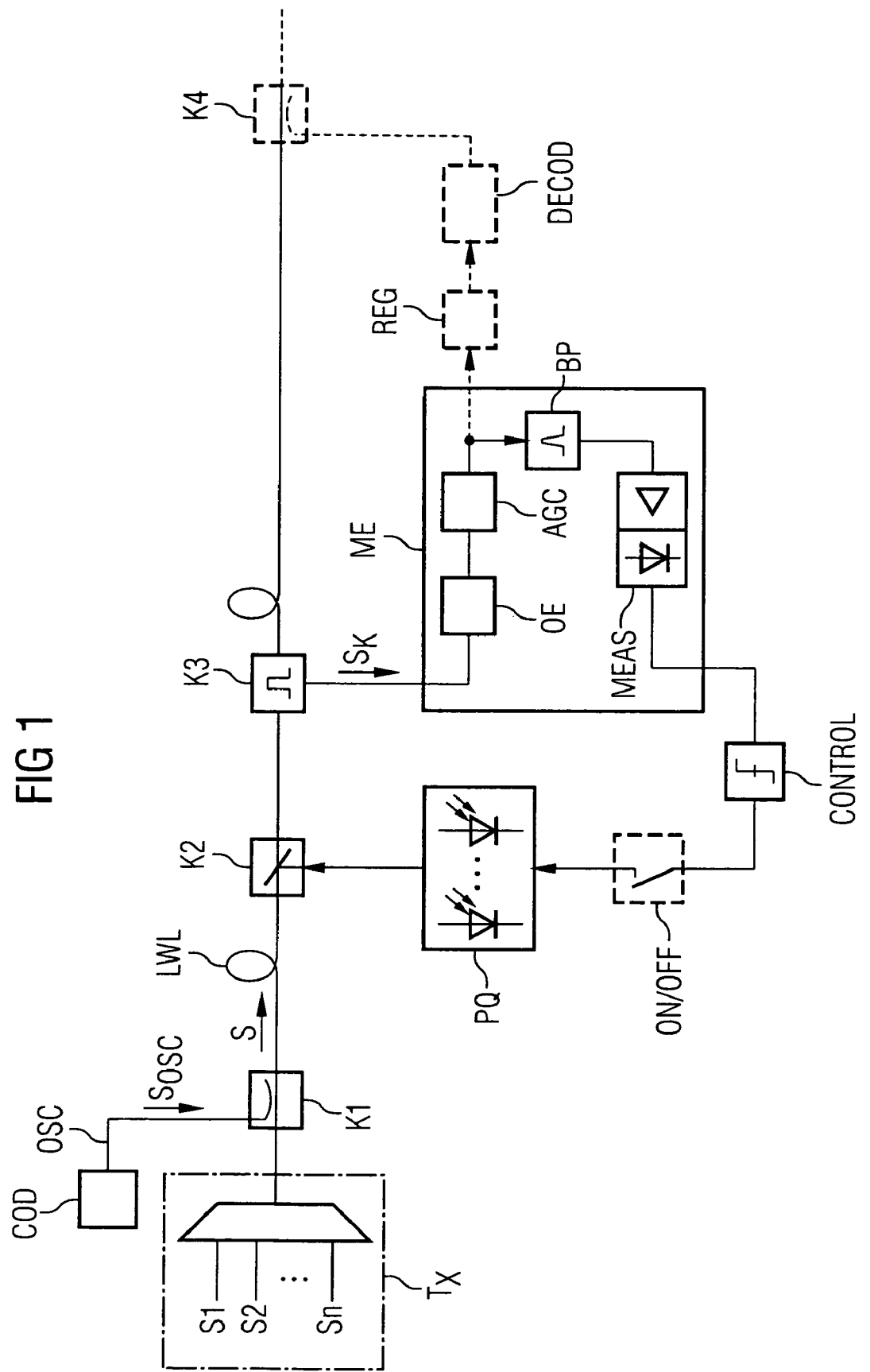
FIG. 1 shows an arrangement for determining a line discontinuity in accordance with the method according to the invention

In FIG. 1 there is an illustration of an arrangement for determining a line discontinuity in accordance with the method according to the invention for detecting a check-back signal. Optical signals S1, S2, . . . , Sn are fed from a transmitting unit Tx into an optical waveguide LWL in a transmission system, said signals are intended, for example, as wavelength or polarization multiplex signals. A first coupler K1 is arranged in the first section of the optical waveguide LWL. An encoding module COD is connected in series to the coupler K1, said encoding module encodes a check-back signal $S_{OSC}$ from a monitoring channel OSC of the transmission system in such a way that defined proportion of its output is concentrated in a narrow-band spectral range. To this end, the encoding module has a scrambler with subsequent CMI or RZ encoding. Here the clock frequency of the check-back signal is selected as the centre of the spectral range. In a further section, there are placed a second coupler K2 for feeding in at least one pump signal from a pump source PQ and a third subsequent decoupler K3 for bifurcating the check-back signal $S_{OSC}$ from the optical waveguide LWL. It is also possible to arrange several subsequent couplers K2 for feeding in pump signals from several pump sources. The decoupled check-back signal $S_{OSC}$ is delivered to a measuring device ME. The measuring device ME has an opto-electrical modulator OE with a subsequent amplifier AGC (automatic gain control), which are usually used for the network management in an interface with decoupling of a check-back signal of the monitoring channel. The elements OE and AGC used here, have here the bandwidth of the check-back signal, so that the element AGC can also feed a regenerator REG with subsequent decoding module DECOD with descrambler. Therefore, in the exemplary embodiment chosen here, the check-back signal $S_{OSC}$ can be supplied to the network management for evaluating and new data can be supplied onwards from the network management via a further encoding module COD with further scrambler and via an electrical-optical interface to the coupler K4. The opto-electric modulation and amplification of the decoupled check-back signal $S_{OSC}$ is linear and not amplitude limited so that the narrow-band spectral range of the decoupled check-back signal $S_{OSC}$ is not suppressed in its signal noise by amplitude limiting. The amplifier AGC has, moreover, a subsequent narrow-band band-pass filter BP, the relative bandwidth of which is about 5 to $10.10^{-5}$ of the total bandwidth from, for example, 2-3 MHz, of the check-back signal $S_{OSC}$. In the absence of the spectral line from the decoupled filtered check-back signal $S_{OSC}$ at the exit of the filter BP, a line discontinuity is inevitably detected. A threshold detector CONTROL, inserted with a preset threshold, with series connected amplifier and rectifier as measuring module MEAS for determining an output level P, controls the switching on and off of the pump source PQ by means of a switch ON/OFF. When the transmission system is put into operation, all pump sources are switched off and are only switched on if the spectral line is present in the measuring module MEAS.

Figure 2:
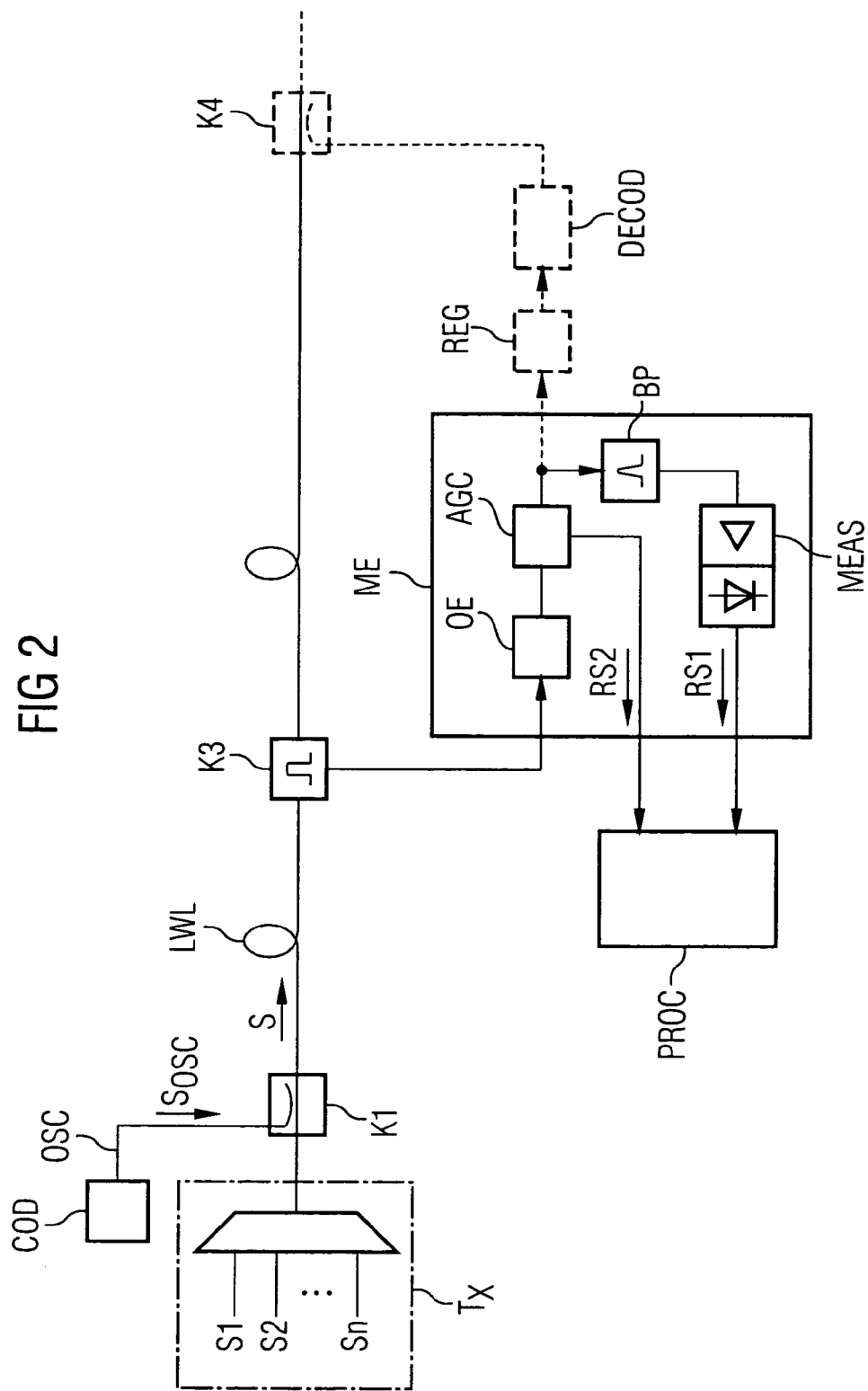
FIG. 2 shows an arrangement for measuring the transmission attenuation in accordance with the method according to the invention

FIG. 2 shows an arrangement for measuring the transmission attenuation in accordance with the method according to the invention for detecting a check-back signal. For reasons of clarity, FIG. 2, has the features for the detection of a check-back signal as per FIG. 1 except for the components K2, PQ, ON/OFF, CONTROL. Signals RS1, RS2 from the measuring module MEAS and from the gain controller AGC are transmitted to an evaluation unit PROC for measuring the transmission attenuation using the value determined for the output level P and for the set gain on the gain controller AGC. Here, as opposed to FIG. 1, the output value P is determined analogously. In order to calculate the transmission attenuation, the evaluation unit sets up the ratio between the output determined at the exit of the decoupler K3 and the output of the check-back signal $S_{OSC}$ fed in at the sending end using the coupler K1.

The invention claimed is:

1. A method for detecting a check-back signal in an optical transmission system for optical signals, comprising:
   concentrating a constant proportion of an output in a defined frequency range of the check-back signal in a narrow-band spectral range;
   feeding the check-back signal into the transmission system at a sending end; decoupling the check-back signal after a section of the transmission system;
   modulating, amplifying and filtering the decoupled check-back signal to isolate the narrow-band spectral range of the check-back signal; and
   determining the output of the isolated narrow-band spectral range for the detection of the check-back signal, wherein the amplification of the check-back signal decoupled from the transmission system is linear and an amplitude limiting process is not performed on the check-back signal so that if there is a high proportion of noise, the check-back signal is still detected in the narrow-band spectral range;
   wherein a concentration of a constant proportion of the output of the check-back signal is created in the narrow-band spectral range by evenly distributing ones and zeros from data of the check-back signal, followed by encoding; and
   wherein scrambling is used to evenly distribute ones and zeros from the data of the check-back signal and then a CMI or RZ encoding is used to create a spectral line.

2. The method according to claim 1, wherein the opto-electric modulation and the amplification of the decoupled signal is provided at least for the data bandwidth of the check-back signal.

3. The method according to claim 2, wherein after the opto-electric modulation and the amplification of the decoupled signal, an additional regeneration of the check-back signal is provided.

4. A method for determining a line discontinuity in a transmission system, comprising:
   concentrating a constant proportion of an output in a defined frequency range of a check-back signal in a narrow-band spectral range;
   feeding the check-back signal into the transmission system at a sending end;
   decoupling the check-back signal after a section of the transmission system;
   modulating, amplifying an filtering the decoupled check-back signal to isolate the narrow-band spectral range of the check-back signal;
   determining the output of the isolated narrow-band spectral range for the detection of the check-back signal, wherein the amplification of the check-back signal decoupled from the transmission system is linear and an amplitude limiting process is not performed on the check-back signal so that if there is a high proportion of noise, the check-back signal is still detected in the narrow-band spectral range;
   determining an output level of the isolated narrow-band spectral range of the check-back signal; and
   detecting a line discontinuity in the transmission system when an output level is below a preset threshold, wherein a pump source arranged in a section of the transmission system to make the necessary amplification of the optical signals is switched off when the system is in operation, or when the system is not in operation it remains switched off, and wherein if no line discontinuity is determined, the pump source is switched on;
   wherein a concentration of a constant proportion of the output of the check-back signal is created in the narrow-band spectral range by evenly distributing ones and zeros from data of the check-back signal, followed by encoding; and
   wherein scrambling is used to evenly distribute ones and zeros from the data of the check-back signal and then a CMI or RZ encoding is used to create a spectral line.

5. The method according to claim 4, wherein check-back signals from a counter-directional or co-directional or bidirectional monitoring channel of the transmission system are used for counter-directional or co-directional or bidirectional pumps from one or several pump sources for transmission direction.

6. An arrangement for detecting a check-back signal in an optical transmission system for optical signals comprising:
   an optical waveguide for transmitting optical signals, wherein in a first section of the optical waveguide, a first coupler is arranged to couple a check-back signal, to which coupler an encoding module is connected in series for concentrating a constant proportion of the output of check-back signal in a narrow-band spectral range,
   wherein in a further section of the optical waveguide, a decoupler is placed to bifurcate the check-back signal from the optical waveguide,
   wherein the decoupled check-back signal is directed via an opto-electric modulator and further via a gain controller to a narrow-band band-pass filter for isolating the narrow-band spectral range of the decoupled check-back signal,
   wherein a measuring module is subsequent to the band-pass filter;
   wherein a concentration of a constant proportion of the output of the check-back signal is created in the narrow-band spectral range by evenly distributing ones and zeros from data of the check-back signal, followed by encoding; and
   wherein a regenerator with a subsequent decoding module with a descrambler is attached to an output of the gain controller to regenerate the decoupled signal.

7. An arrangement for determining a line discontinuity in a transmission system, comprising:
   an optical waveguide for transmitting optical signals, wherein in a first section of the optical waveguide, a first coupler is arranged to couple a check-back signal, to which coupler an encoding module is connected in series for concentrating a constant proportion of the output of check-back signal in a narrow-band spectral range,
   wherein in a further section of the optical waveguide, a decoupler is placed to bifurcate the check-back signal from the optical waveguide,
   wherein the decoupled check-back signal is directed via an opto-electric modulator and further via a gain controller to a narrow-band band-pass filter for isolating the narrow-band spectral range of the decoupled check-back signal,
   wherein a measuring module is subsequent to the band-pass filter,
   wherein a concentration of a constant proportion of the output of the check-back signal is created in the narrow-band spectral range by evenly distributing ones and zeros from data of the check-back signal, followed by encoding, and wherein a regenerator with a subsequent decoding module with a descrambler is attached to an output of the gain controller to regenerate the decoupled signal.

8. The arrangement according to claim 7, wherein a first coupler for coupling a check-back signal is arranged in a first section of the optical waveguides, to which coupler an encoding module is connected in series to concentrate a constant proportion of the output of the check-back signal in a narrow spectral range, wherein in a further section of the optical waveguide there is placed a decoupler for bifurcating the check-back signal from the optical waveguide, wherein the decoupled check-back signal is fed to a narrow-band band-pass filter for isolating the spectral range of the decoupled check-back signal via an opto electric modulator and further via a gain controller, and wherein a measuring module is subsequent to the band-pass filter, wherein at least a second coupler for feeding in at least one pump signal from a pump source is connected in series to the decoupler, wherein the measuring module has an amplifier and a rectifier for determining an output level after at least two gauge readings from the isolated spectral range, and wherein subsequently a threshold detector is connected to the rectifier, and the output signal of the threshold detector is directed to a switch for switching the pump signals of the pump source on or off.

9. The arrangement according to claim 6, wherein a coupler is placed in a further section of the optical waveguide for feeding in the regenerated decoupled signal.

10. The arrangement according to one of the claims 7, wherein a regenerator with subsequent decoding module with descrambler is attached to an exit of the gain controller to regenerate the decoupled signal.

11. The arrangement according to claim 10, wherein a coupler is placed in a further section of the optical waveguide for feeding in the regenerated decoupled signal.

12. The arrangement according to claim 6, wherein the components can be integrated in one or several decoupling lines of a monitoring channel with check-back signal used for network management, whereby, on the one hand, encoding module is connected in series to the coupler placed in the transmission system at the sending end and, on the other hand, the regenerator is connected in series to the decoding module.

13. The arrangement according to claim 7, wherein the components can be integrated in one or several decoupling lines of a monitoring channel with check-back signal used for network management, whereby, on the one hand, encoding module is connected in series to the coupler placed in the transmission system at the sending end and, on the other hand, the regenerator is connected in series to the decoding module.

14. The arrangement according to claim 6, wherein the spectral range has 50% of the total output of the check-back signal issuing from the encoding module.

15. The arrangement according to claim 7, wherein the spectral range has 50% of the total output of the check-back signal issuing from the encoding module.

16. The arrangement according to claim 6, wherein the output level can be detected or determined when the pump source arranged in the optical waveguide whether said pump source is switched on or off.

17. The arrangement according to claim 7, wherein the output level can be detected or determined when the pump source arranged in the optical waveguide whether said pump source is switched on or off.

18. An arrangement for detecting a check-back signal in an optical transmission system and for determining a line discontinuity in a transmission system, the arrangement comprising:

an optical waveguide for transmitting optical signals, wherein in a first section of the optical waveguide, a first coupler is arranged to couple a check-back signal, to which coupler an encoding module is connected in series for concentrating a constant proportion of the output of check-back signal in a narrow-band spectral range, wherein in a further section of the optical waveguide, a decoupler is placed to bifurcate the check-back signal from the optical waveguide, wherein the decoupled check-back signal is directed via an opto-electric modulator and further via a gain controller to a narrow-band band-pass filter for isolating the narrow-band spectral range of the decoupled check-back signal, wherein a measuring module is subsequent to the band-pass filter, wherein a concentration of a constant proportion of the output of the check-back signal is created in the narrow-band spectral range by evenly distributing ones and zeros from data of the check-back signal, followed by encoding, and wherein a regenerator with a subsequent decoding module with a descrambler is attached to an output of the gain controller to regenerate the decoupled signal.

\* \* \* \* \*